US007289771B2

(12) United States Patent
Davis

(10) Patent No.: US 7,289,771 B2
(45) Date of Patent: *Oct. 30, 2007

(54) METHOD AND APPARATUS FOR ASSIGNING DATA RATE IN A MULTICHANNEL COMMUNICATION SYSTEM

(75) Inventor: Brad Davis, Longmont, CO (US)

(73) Assignee: Kyocera Wireless Corp., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/383,429

(22) Filed: May 15, 2006

(65) Prior Publication Data

US 2006/0194547 A1    Aug. 31, 2006

Related U.S. Application Data

(63) Continuation of application No. 09/938,907, filed on Aug. 24, 2001, now Pat. No. 7,046,966.

(51) Int. Cl.
*H04B 1/00* (2006.01)
(52) U.S. Cl. ........................................ 455/69; 455/522
(58) Field of Classification Search ............... 455/69, 455/522
See application file for complete search history.

(56) References Cited

U.S. PATENT DOCUMENTS 4,901,307 A    2/1990    Gilhousen et al.
5,103,459 A    4/1992    Gilhousen et al.
5,812,938 A    9/1998    Gilhousen et al.
5,926,500 A    7/1999    Odenwalder
6,137,789 A    10/2000    Honkasalo
6,212,399 B1    4/2001    Kumar et al.
6,337,973 B1    1/2002    Agin et al.
6,366,763 B1    4/2002    Ue et al.
6,393,276 B1    5/2002    Vanghi
6,434,135 B1    8/2002    Ozluturk et al.
6,775,548 B1    8/2004    Rong et al.

*Primary Examiner*—Fan Tsang
*Assistant Examiner*—Simon Sing

(57) ABSTRACT

A method of assigning transmission data rate in a multi-channel communication system based upon a comparison between projected transmitter power output for transmission at a selected data rate, and the maximum transmitter power capability. Relative power requirements for high and low processing gain channels are stored in a LUT in memory, for a variety of data transmission rates. By accessing the LUT, the relative power required for transmission over a low processing gain channel at a selected data rate can be determined. This power is then added to the current output power required by active high processing gain channels to determine the projected output power required once the low processing gain, or data, channel is brought online at the selected data rate. Data rate is increased or decreased until the projected output power is within a pre-selected transmitter output power tolerance, then that data rate is proposed to the receiver.

16 Claims, 6 Drawing Sheets

METHOD AND APPARATUS FOR ASSIGNING DATA RATE IN A MULTICHANNEL COMMUNICATION SYSTEM

RELATED APPLICATIONS

This is a continuation of U.S. application Ser. No. 09/938,907, filed Aug. 24, 2001 now U.S. Pat. No. 7,046,966, which is hereby incorporated by reference.

FIELD OF THE INVENTION

The present invention relates to wireless communications over a variety of channels in a communication link. More particularly, the present invention relates to a method and apparatus for negotiating data rates for individual channels of a multi-channel communication system in order to remain within available transmission power corresponding to that rate.

BACKGROUND OF THE INVENTION

Many communication systems including cellular, satellite, and point to point communication systems use a wireless link comprised of a modulated radio frequency (RF) signal to transmit data between two locations. The use of a wireless link is desirable for a variety of reasons including increased mobility and reduced infrastructure requirements when compared to wire line communications systems. One drawback of using a wireless link is the limited amount of communication capacity that results from the limited amount of available RF bandwidth. This limited communication capacity is in contrast to wire-based communication systems where additional capacity can be added by installing additional hardwire connections.

Recognizing the limited nature of RF bandwidth, various signal processing techniques have been developed for increasing the efficiency with which wireless communication systems utilize the available RF bandwidth. One widely accepted example of such a bandwidth-efficient signal processing technique is the IS-95 over-the-air interface standard and its derivatives such as IS-95-A (referred to collectively hereafter as the IS-95 modulation schemes) promulgated by the Telecommunication Industry Association (TIA) and used primarily within cellular telecommunication systems. The IS-95 modulation scheme incorporates code division multiple access (CDMA) signal modulation techniques to create multiple communication channels simultaneously over the same RF bandwidth. In a CDMA cellular telecommunication system, multiple signals are transmitted simultaneously at the same frequency. Such a CDMA system is disclosed in U.S. Pat. No. 4,901,307 to Gilhousen et al., entitled "Spread Spectrum Multiple Access Communication System Using Satellite or Terrestrial Repeaters" and in U.S. Pat. No. 5,103,459 also to Gilhousen et al., entitled "System and Method for Generating Signal Waveforms in a CDMA Cellular Telephone System", both of which are incorporated by reference. In this type of system, a particular receiver determines which signal is intended for it by a unique spreading code in the signal. Signals at that frequency, without the unique spreading code, appear as noise to that receiver and are ignored. Allowing multiple communication links over the same bandwidth increases the total number of voice calls and other communications that can be conducted in a wireless communication system by, among other things, increasing the frequency reuse in comparison to other wireless telecommunication technologies.

CDMA modulation employs a spread spectrum technique for the transmission of information. In a spread spectrum system, the transmitted signal is spread over a wide frequency band in a pseudorandom fashion. This frequency band is typically substantially wider than the minimum bandwidth required to transmit the signal. The spread spectrum technique is accomplished by modulating each baseband signal to be transmitted with a unique wideband spreading code. Using this technique, a signal having a bandwidth of only a few kilohertz can be spread over a bandwidth of more than a megahertz. A form of frequency diversity is obtained by spreading the transmitted signal over a wide frequency range. Since only 200-300 kHz of a signal is typically affected by a frequency selective fade, the remaining spectrum of the transmitted signal is unaffected. A receiver for the spread spectrum signal, therefore, will be affected less by the fade condition.

In prior art cellular telecommunication systems using CDMA, each voice circuit was assigned a unique code and transmitted on a single channel simultaneously with other voice-coded circuits using the spread spectrum technique. The receiver recovered the signal from the noise by using the same code as the transmitter. Using CDMA, even very low power signals could be recovered by the receiver. Later CDMA systems include data transmission capability, such as electronic mail, facsimile, and Internet access, over additional channels, for use by the subscriber.

A highly simplified CDMA cellular telecommunication system is shown in FIG. 2. Three telephone subscriber mobile units 12a-c are shown along with a single base station 10 within cell 100. A cell is generally defined as a particular RF coverage area and as a mobile changes location, it will possibly move from one cell to the next. Base station 10 is a multicircuit transceiver located at the center of cell 100 whose primary purpose is to handle incoming and outgoing calls within the cell. Calls originating from a particular mobile will be relayed through base station 10. All mobile communications occur through the base stations of each cell via RF transmission, as well as through a mobile telephone switching office (MTSO) computer that is wired to each base station. Reverse channel link R represents RF communication from mobile 12a to base station 10, while forward channel link F represents RF communication from base station 10 to mobile 12a, when mobile 12a is online.

The forward CDMA link contains one or more code channels for communication that are transmitted on a CDMA frequency assignment using a particular pilot pseudorandom noise offset. The frequency assignment is a 1.2288 MHz segment of spectrum centered on a specified channel. Current IS-95 systems always include a pilot channel, possibly one sync channel, as many as seven paging channels, and up to 63 traffic channels, providing that the total including the pilot does not exceed 64, in the forward link.

While earlier CDMA cellular telephone communications did not provide multiple channels to the subscriber in the reverse link, the reverse link of third generation CDMA cellular telephones, for example, CDMA 2000 and W-CDMA (wideband CDMA), provide different channels for access, signaling, voice, and data communications. The different channels available in the reverse link provide a more versatile and efficient communication device for the subscriber.

Attention is directed to FIG. 3 for a background discussion of reverse link CDMA channels for spreading rates 1 and 3. Spreading rate (SR) is the pseudorandom noise (PN) chip rate of a direct-sequence carrier. SR1 is 1.2288 MHz and is commonly referred to as 1.times. SR3 is three times this rate, or 3.6864 MHz and is commonly referred to as 3.times. FIG. 3 depicts CDMA channels and their respective "modes of operation" for two modulation schemes, the earlier IS-95 and the later CDMA 2000. Access channel 50 and reverse traffic channel operation 52 are earlier IS-95 modulation schemes. Enhanced access channel operation 58, reverse common control channel operation 64, and reverse traffic channel operation 70 are CDMA 2000 modulation schemes. Many current mobile units implement some of both modulation schemes. In order to transition from the earlier IS-95 to the CDMA 2000 modulation scheme, CDMA 2000 mobiles are being deployed in two design phases. The first phase CDMA 2000 mobiles operate an access channel 50 under the IS-95 modulation scheme, and reverse traffic channel operation 70 under the CDMA 2000 modulation scheme. It is intended that the second phase CDMA 2000 mobiles will replace access channel 50 with enhanced access channel operation 58 and will add reverse common control channel operation 64. The first phase CDMA 2000 mobiles are currently in production using the SR-1 1.2288 MHz (1.times.) PN rate and are operable with radio configurations (RC) 3 and 4 in the reverse link. It is intended that second phase CDMA 2000 mobiles will implement a 3.6864 MHz (3.times.) PN rate and will operate with radio configurations 5 and 6 in the reverse link. RC is the manner in which data bits are built from the voice encoder, or vocoder, and output to the modulator. RC is defined by a "rate set" which includes transmission rate, modulation characteristics, and error correction coding schemes, as defined in the IS2000 standard specifications. For example, RC 1 has a 9600 bits per second (bps) data rate while RC 2 operates at 14400 bps. Radio configurations are typically built into an application specific integrated circuit within each mobile and relate to both the forward and reverse links.

Reverse traffic channel operation 52, enhanced access channel operation 58, reverse common control channel operation 64, and reverse traffic channel operation 70 each have more than one "mode of operation" because a variety of channel modes of operation operate within their respective channel designations. Reverse traffic channel operation 52 operates in either of two modes, as a reverse fundamental channel 54, or up to as many as seven reverse supplemental code, or data, channels 56 in earlier IS-95 systems. Enhanced access channel operation 58 always includes a reverse pilot channel 60 along with an enhanced access channel 62. Reverse common control channel operation 64 always includes a pilot channel 66 as well as the reverse common control channel 68. Reverse common control channel 68 accommodates more than one user at a time and is used for the transmission of user and signaling information to the base station when reverse traffic channels are not in use. Reverse traffic channel operation 70, operable for RC 3 to RC 6, always includes pilot channel 72 and a power control subchannel 80. Reverse traffic channel operation 70 can also contain zero or one dedicated control channel 74, zero or one reverse fundamental channel 76, and zero, one, or two reverse supplemental channels 78. Thus, reverse traffic channel operation 70 operates as one of many possible combinations of channels. First and second phase CDMA 2000 channel modes of operation are described further below.

Although the pilot channel is identified separately at 60, 66, and 72 in FIG. 3 for ease of reference, there is only one pilot channel. The pilot channel operates as a pilot for either enhanced access channel operation 58, reverse common control channel operation 64, or reverse traffic channel operation 70, depending on which channel designation is currently being operated. The pilot channel provides timing information from the mobile for a coherent link between the mobile and base station.

Access channel 50 is used for short signaling message exchanges such as call origination, responses to pages, and registrations, and is a slotted random access channel. During access to the base station, the mobile begins with a calculated transmission output power and steps up the power using a "slotted aloha" protocol until the base station is able to demodulate the signal and acknowledges this to the mobile. At that point the output power is set and a service configuration is negotiated. Enhanced access channel operation 58 is presently intended to be available in future releases of CDMA 2000 and will provide improved system capacity when in use.

Mobile units use the reverse common control channel 68 to sign in with the base station, gain access, and register (identify mobile location and parameters to the base station). This channel will also allow short data bursts commonly referred to as a "short messaging system" (SMS). Dedicated control channel 74 is used only for ongoing signaling information such as pilot strength, pilot set, system parameters, updates, and hand-off messages. Voice, or signaling, can be transmitted over the fundamental channels 76 by various multiplexing options. Alternatively, the fundamental channels 76 can be used exclusively for voice transmission by allocating all signaling to the dedicated control channel 74. Up to two supplemental, or data, channels 78 are used solely for data transmission. At present, each supplemental channel 78 can be set to a data rate between 1.2 kbps and 1.037 Mbps depending upon the proximity of the base station, available power, and number of other users within the cell. Power control subchannel 80 is commonly referred to as a subchannel because it is "punctured" onto the pilot channel and controls the base station power to the mobile, in the forward link. In other words, at a particular time the pilot bits are temporarily replaced with a code instructing the base station to increase or decrease power to the mobile as needed.

Each channel mode of operation (referred to hereinafter as "channel") in the reverse link is provided with coding for spreading the signal transmitted over the channel and for distinguishing each mobile from all others in a cell. First, a short code is overlaid onto the pilot to provide pseudorandom spreading in the reverse link, and then a long code is overlaid to separate the mobile code from all others. This is accomplished through Hybrid Phase Shift Keying (HPSK), also known as Orthogonal-Complex Quadrature Phase Shift Keying (OC-QPSK), and the use of orthogonal Walsh codes. An example of this process is depicted in FIG. 4, a communications mapping diagram set out in the TIA IS-2000 specification, for a particular set of reverse link channel modes of operation: reverse pilot 60 (66 and 72), reverse dedicated control 74, reverse fundamental 76, reverse supplemental 78', and either of another reverse supplemental channel 78, reverse common control channel 68, or the enhanced access channel 62, operable with RC 3 or 4. In FIG. 4, binary zeroes are mapped with a +1 and binary ones are mapped with a −1, unused channels and gated-off symbols are represented with zero values, and when the reverse common control or enhanced access channels are used, the reverse pilot channel is the only other channel available. "I-channel" refers to in-phase channel and "Q-channel" refers to quadrature phase channel, the information on each being separated by 90.degree.

Each of the different channel modes of operation described above can come from different base data rates, hence the processing gain (for a constant bandwidth) protecting the signal in the over-the-air channel varies, and the signal-to-noise ratio required at the base station in order to decode the signal varies. Processing gain is the ratio of the bandwidth of a spread spectrum signal to the data rate of the information being transmitted. High processing gain is preferred for providing high system capacity and better quality communication links. Generally, access, pilot, fundamental and dedicated control channel modes of operation have a lower data rate, relatively high processing gain, and a lower signal to noise requirement at the base station. Conversely, each data, or supplemental, channel mode of operation generally has a higher data rate, relatively low processing gain, and a higher signal to noise requirement at the base station. One problem that arises in CDMA communication using multiple channels is that the base station does not know the amount of remaining power that the mobile unit can apply to a lower processing gain channel when the mobile is in communication with the base station on a higher processing gain channel. Consequently, when a lower processing gain channel does come into operation, such as for data transmission, the call may be dropped or high error rates may occur due to the additional power required to transmit the signal over the low processing gain channel exceeding the power transmission capacity of the mobile unit.

Prior art patents discuss power control in CDMA systems but do not address the above problem that occurs when the transmission power required increases due to the addition of one, or more, channels. U.S. Pat. No. 5,926,500 to Odenwalder, entitled "Reduced Peak-To-Average Transmit Power High Data Rate CDMA Wireless Communication System" refers to the generation of a CDMA reverse link with channels having varying processing gains and data rates. However, Odenwalder notes that the total transmission rate can be increased either by transmission over a particular channel at higher rates or by multiple transmission over multiple channels, or both, until the signal processing capability of the receive system, the base station, is exceeded and the error rate becomes unacceptable, or the maximum transmit power of the transmit system, or mobile, is reached. Odenwalder does not provide a solution for keeping the system from exceeding the acceptable error rate or maximum transmit power of the mobile which results in dropped calls. U.S. Pat. No. 5,812,938 to Gilhousen et al. entitled "Reverse Link, Closed Loop Power Control In a Code Division Multiple Access System" describes a method for instructing the mobile to increase or decrease its power depending upon the required $E_b$/No for a particular data rate. (Signal to noise ratio is routinely defined as: $E_b$/No, where "$E_b$" represents the energy per digital bit period and "No" represents noise.) Like Odenwalder, this patent also does not address the issue of dropped calls when the addition of a reverse channel causes the mobile to exceed its maximum transmitter power output, but rather only recognizes the need for increasing transmitter power to meet the required $E_b$/No of the base station receiver.

When the mobile is gaining access to the telecommunication system, it negotiates the channel configuration based solely on its ability to generate the required data rate. The mobile does not communicate its transmission power capability. Power capability is assumed because the mobile is indeed in communication, but it is in communication at this point only because it is using a higher processing gain channel (at or below 14.4 kbps). It will increase the slotted aloha probe only to determine where the higher processing gain channel is successfully demodulated by the base station. Consequently, when a higher data rate, lower processing gain channel comes into operation, there may not be enough power available from the mobile on the reverse link to sustain the communication connection.

This lack of power availability problem also arises when the mobile changes location in relation to the base station or the cell environment changes. For example, after a data rate has been negotiated, the mobile may discontinue transmission of the data channel periodically because there is no data to be transmitted. During this quiescent period, communication between the base station and the mobile is maintained using only the higher processing pilot gain channel. If the mobile changes location during this period, the amount of required transmit power for the data channel may change. If the mobile moves away from the base station, there will be less power available to transmit on the reverse data channel when it is required; if the mobile moves closer to the base station, more power may be available. Other objects, such as large vehicles, in the path of the RF signal, may block signal transmission to and from the mobile, thereby changing the power requirement. When the data channel comes back into operation at the former data rate, the power it demands may cause the signaling channel power to drop below the receiver requirements of the base station and the call may be dropped. Table 1 below provides an extreme example of the relative power required for three channels, pilot, dedicated control, and supplemental, in a signaling-only versus a data transmission communication at 153.6 kbps, for an IS-98D standard, Class III mobile that is transmitting at a constant power output of 23 dBm, operating in band class 0.

TABLE 1

| Channel Power Required (dBm) | |
| --- | --- |
| Signaling (Control Hold) | Active Data (153.6 kbps) |
| Pilot = 17.7 | Pilot = 11.8 |
| Dedicated Control = 21.5 (9600 bps) | Dedicated Control = 11.1 (9600 bps) |
| | Supplemental Data = 22.4 |

The example in Table 1 demonstrates that during signaling the pilot must transmit at 17.7 dBm to maintain a connection to the base station, and the dedicated control channel must transmit at 21.5 dBm. However, in order for the subscriber to begin transmitting data at the 153.6 kbps rate, the transmission power available for the dedicated control and pilot channels would have to drop substantially, which would result in a lost connection to the base station and a dropped call.

Because the newer CDMA telecommunication systems provide pilot, dedicated control, supplemental control, data, and voice in the reverse link, it is difficult to obtain enough power from currently available RF amplifiers used in mobile transmitters. One way to retain current RF power amplifier designs and remain within the usable linear portion of these amplifiers, is to negotiate the communication data rate in the reverse link based upon the channel or channels being used, so that the addition of a data channel, or channels, to other active channels, does not require transmission power that exceeds available output power. Current telecommunication systems have no method by which the base station is provided with prior knowledge of the mobile transmitter power status during communication over higher processing gain channels. Accordingly, there is a great need for a method that allows the mobile and base station to negotiate a data rate for low processing gain channels while in communication over higher processing gain channels. It would be beneficial if the system could remain within the maximum transmit output power capacity of the mobile when the low processing gain channel comes online and thus avoid dropped calls. This method should additionally allow the mobile to adjust the data rate to remain within available transmitter power when the mobile changes location within a cell, when the mobile moves to a different cell, or when the cell environment changes.

SUMMARY OF THE INVENTION

The present invention provides a method of negotiating the data rate between a transmitter and a receiver in a communication system wherein transmission occurs over a plurality of channels in a particular link. The method results in assigning a data rate such that the power required to transmit at that data rate does not exceed the output power capability of the transmitter.

The present invention provides enhanced CDMA wireless communication system performance by maximizing data rates according to the available mobile output power for systems having multiple channels each with varying processing gains. A primary advantage of the present invention is the ability to provide increased data rates to subscribers of wireless communication services due to more efficient use of available power and the fixed RF frequency bandwidth. Further, because data rates are negotiated so that transmission occurs within available power limits, fewer calls are dropped. Another advantage of the present invention is increased capacity for wireless communication system carriers. Capacity is increased because there are fewer dropped calls and therefore fewer access attempts.

Other advantages and various features, and further scope of applicability of the present invention will be set forth in part in the detailed description to follow, taken in conjunction with the accompanying drawings, and in part will become apparent to those skilled in the art upon examination of the following, or may be learned by practice of the invention.

DETAILED DESCRIPTION OF THE INVENTION

The present invention addresses the problem of exceeding the maximum mobile transmitter output power and potentially losing connection to the base station in CDMA systems having multiple channels in the reverse link when low processing gain channels are brought online in addition to other channels. The invention is a method and apparatus for negotiating the maximum possible data transmission rate for a low processing gain channel. The mobile proposes a data rate to the base station receiver based upon available mobile transmitter output power.

Figure 5:
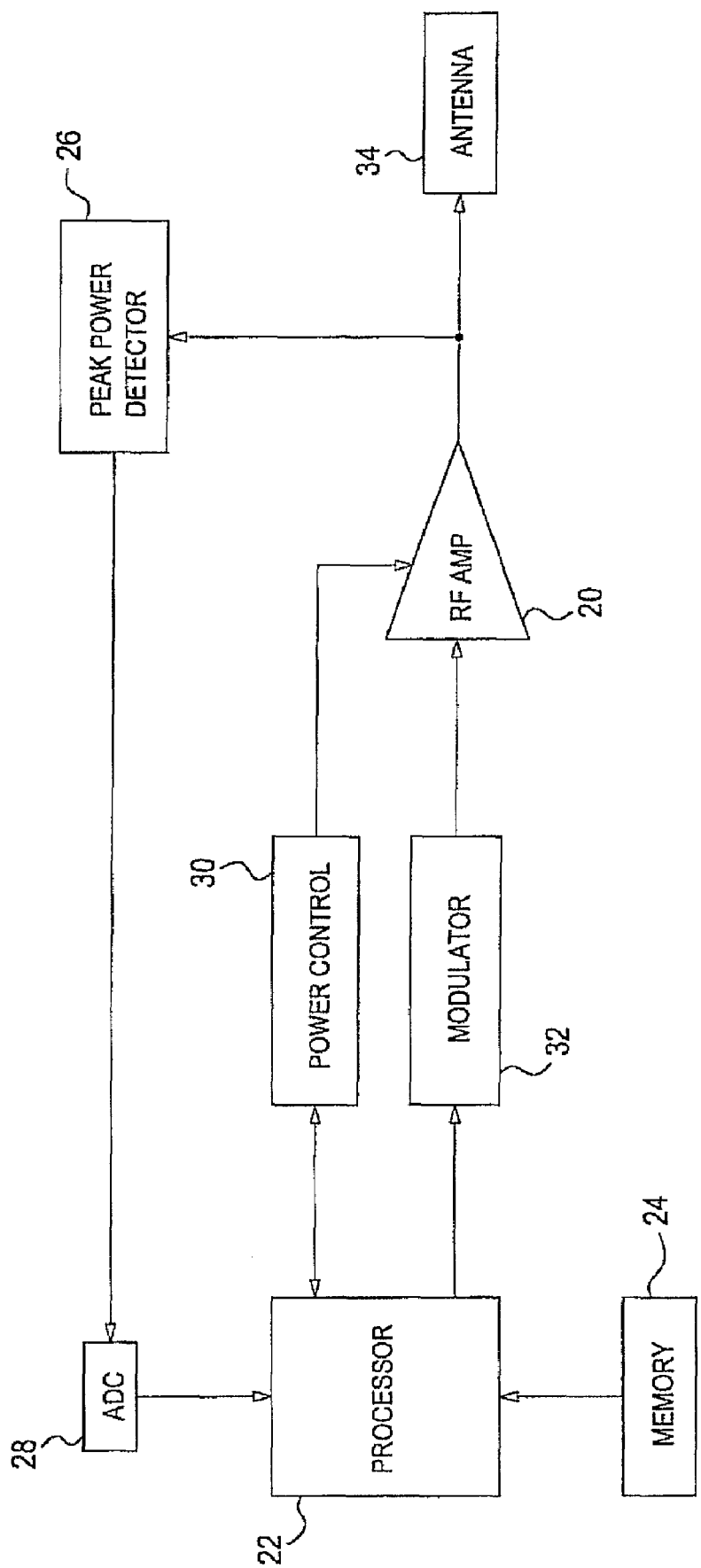
FIG. 5 is a block diagram of prior art CDMA cellular telecommunication mobile unit structure within which the method of the present invention is implemented.

Current mobile units complying with IS-95 standards can be calibrated to limit the maximum allowable mobile transmitter output power based solely upon the usable linear portion of the mobile RF power amplifier. FIG. 5 is a block diagram of the CDMA mobile structure within which a data rate control method may be implemented. The maximum output power limit is presented to processor 22 within the mobile as a digital value in memory 24 which is then compared to an input from mobile peak power detector 26 that has been fed through analog to digital converter (ADC) 28 and further converted to a linearized digital value from a look-up table. If the value for peak power detector 26 is higher than the calibrated limit, processor 22 reduces the output power from RF amplifier 20 to antenna 34 through an existing power control function represented by 30 in FIG. 5. Modulator 32 receives the signal to be transmitted and modulates it for RF transmission to the base station.

An object of the present invention is to control the data rate such that available power is not exceeded. When transmitting on the high processing gain, and pilot, channels in the reverse link, the mobile is aware of its output power due to "open loop" and "closed loop" power control implemented by processor 22 and power control 30. Generally, in CDMA telecommunications, the mobile initially estimates and transmits at an output power based upon the received signal strength from the base station, commonly referred to as "open loop" power control. Then, power control (PC) bits from the base station override open loop power control directing the mobile to transmit at a particular output power based upon the received signal power at the base station, which is referred to as "closed loop" power control. This results in a calibrated automatic gain control value (AGC) at which the transmitter output power is to operate. The mobile is also capable of determining, as discussed below, the amount of additional power it requires to transmit a new negotiated data channel rate that it is preparing to transmit. Current mobile output power is added to the power required to transmit at the negotiated data rate over the data channel before the data channel comes online. If this projected total exceeds the maximum capability of the mobile, a lower data rate is selected; if the projected total is substantially below the maximum capability of the mobile, a higher data rate is selected. This process is repeated until the maximum data rate is selected that will allow transmission within an acceptable power output range. The mobile then proposes this data rate to the base station, and the base station either accepts or rejects the proposed rate. This process takes place within a stated time frame that may be established for a specific implementation, i.e., balancing the objective of highest possible data rate versus user access time to the channel.

In a first preferred embodiment of the invention, a table of relative powers at particular data rates is compiled. The table of relative powers shows the power level of each high processing gain channel relative to the low processing gain channel, or supplemental channel, at different data rates. The table is loaded into a look-up table (LUT) in memory in the mobile unit. Table 2 provides an example. These particular values are derived from known reverse link nominal attribute gains for data rates between 1.2 kbps and 1.0368

Mbps as published in the TIA/EIA/IS-2000.2-A-1 standard. These values are adjusted by the known mean code channel output power equation taken from the TIA/EIA/IS-2000.2-A-1 standard:

$$\text{mean code channel output power}(dBm) =$$
$$\text{mean pilot channel output power}(dBm) + 0.125. \text{ times.}$$
$$(\text{Nominal Attribute Gain [Rate, Frame Duration, Coding]} +$$
$$\text{Attribute Adjustment Gain [Rate, Frame Duration, Coding]} +$$
$$\text{Reverse Channel Adjustment Gain [Channel]} -$$
$$\text{Multiple Channel Adjustment Gain [Channel]} -$$
$$\text{Variable Supplemental Adjustment Gain [Channel]} +$$
$$RLGAIN \text{ TRAFFIC PILOT}_s +$$
$$RLGAIN \text{ SCH PILOT [Channel]}_s) + IFHHO \text{ } SRCH \text{ } CORR,$$

where "code channel" and ["Channel"] identify either the reverse fundamental channel, reverse dedicated control channel, or any of the reverse supplemental channels. Table 2 assumes a mobile transmitter capable of a maximum output power in the range of 23 to 30 dBm (200 to 1,000 mW), for an IS-98D standard, class III mobile operating in band class 0. The example depicted in Table 2 shows power levels for the pilot, dedicated control and fundamental channels relative to the supplemental channel (0 dB), with the output for the pilot channel remaining constant at 59.3 mW across each column for different supplemental channel transmission data rates. Table 2 assumes a constant mobile signal strength requirement based on signal environment in relation to a base station.

TABLE 2

LUT Relative Powers (dB)

| Data Rate (bps) | 9600 | 19200 | 38400 | 76800 | 153600 |
|---|---|---|---|---|---|
| Pilot | −3.75 | −6.25 | −7.5 | −9.0 | −10.5 |
| Dedicated Control (9600 bps) | 0 | −2.65 | −5.125 | −7.875 | −11.25 |
| Fundamental | 0 | −2.65 | −5.125 | −7.875 | −11.25 |
| Supplemental | 0 | 0 | 0 | 0 | 0 |

The relative powers in Table 2 can be described with reference to the absolute powers in Table 1. Referring to Table 1, in a signaling-only communication from a mobile at a transmitter output power of 23 dBm (200 mW), the pilot channel requires 17.7 dBm (59.3 mW) and the dedicated control channel requires 21.5 dBm (140.7 mW). In other words, in order to maintain contact with the base station at that mobile location within the cell, the pilot channel must be maintained at 17.7 dBm, and the dedicated control channel must be at least 3.75 dB above the pilot channel power of 17.7 dBm, or 21.5 dBm. This relative power is shown in the first column of Table 2. According to the first column of Table 2, if a supplemental channel is brought online at a data rate of 9600 bps, in addition to the already-active, high processing gain, pilot and dedicated control channels, it would also require 21.5 dBm (140.7 mW), because it is also 3.75 dB above the pilot channel. Therefore, the absolute output power required by the active channels prior to bringing the supplemental channel online is 200 mW, or 23 dBm. The projected absolute output power required once the supplemental channel came online would be 59.3 mW (pilot)+140.7 mW (dedicated control)+140.7 mW (supplemental)=340.7 mW, or 25.3 dBm, which is safely within the maximum output power capability (30 dBm) of the mobile transmitter. The fundamental channel would also require 140.7 mW if it were brought online.

In the second column of Table 2, for a higher data rate, the pilot channel still requires 17.7 dBm (59.3 mW) of power to maintain the connection with the base station. According to the second column of Table 2, the dedicated control channel power required is (−2.65−(−6.25)) or 3.6 dB above the pilot channel power (134.9 mW), and the supplemental channel would require 6.25 dB more power than that of the pilot channel if it were brought online at 19200 bps (248.3 mW). The relative pilot power increases slightly in successive columns in Table 2 to maintain coherency in the communication link; as there is less processing gain on the supplemental channel, the timing must be highly accurate. Therefore, the absolute output power required for the two active channels prior to bringing the supplemental channel online is 194.2 mW, or 22.8 dBm, and the projected absolute output power required if the supplemental channel were added at 19200 bps would be 442.5 mW, or 26.4 dBm. Similar calculations can be made for the remaining three columns of Table 2.

Figure 3:
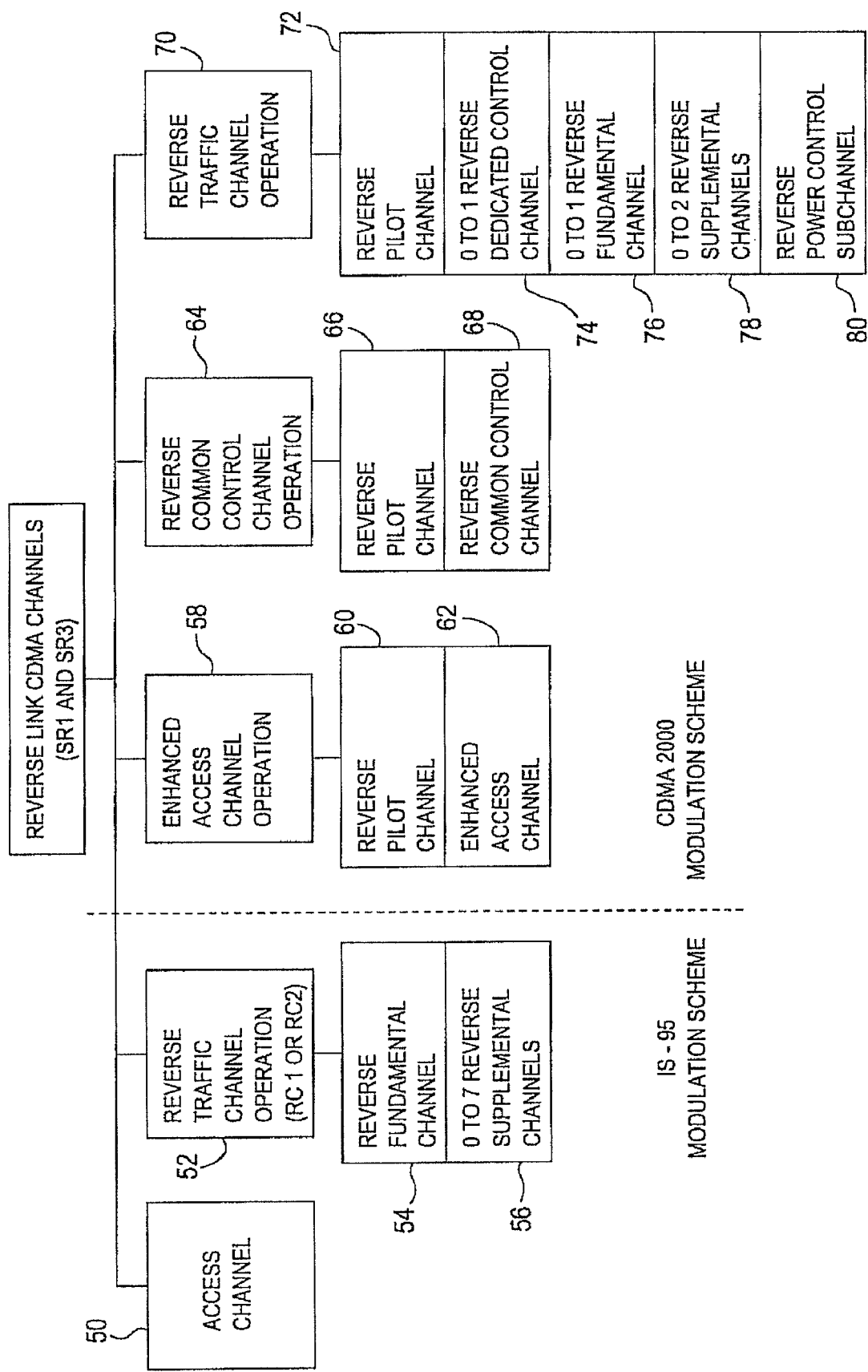
FIG. 3 is a diagram of typical reverse link CDMA cellular telecommunications system channels.
Figure 4:
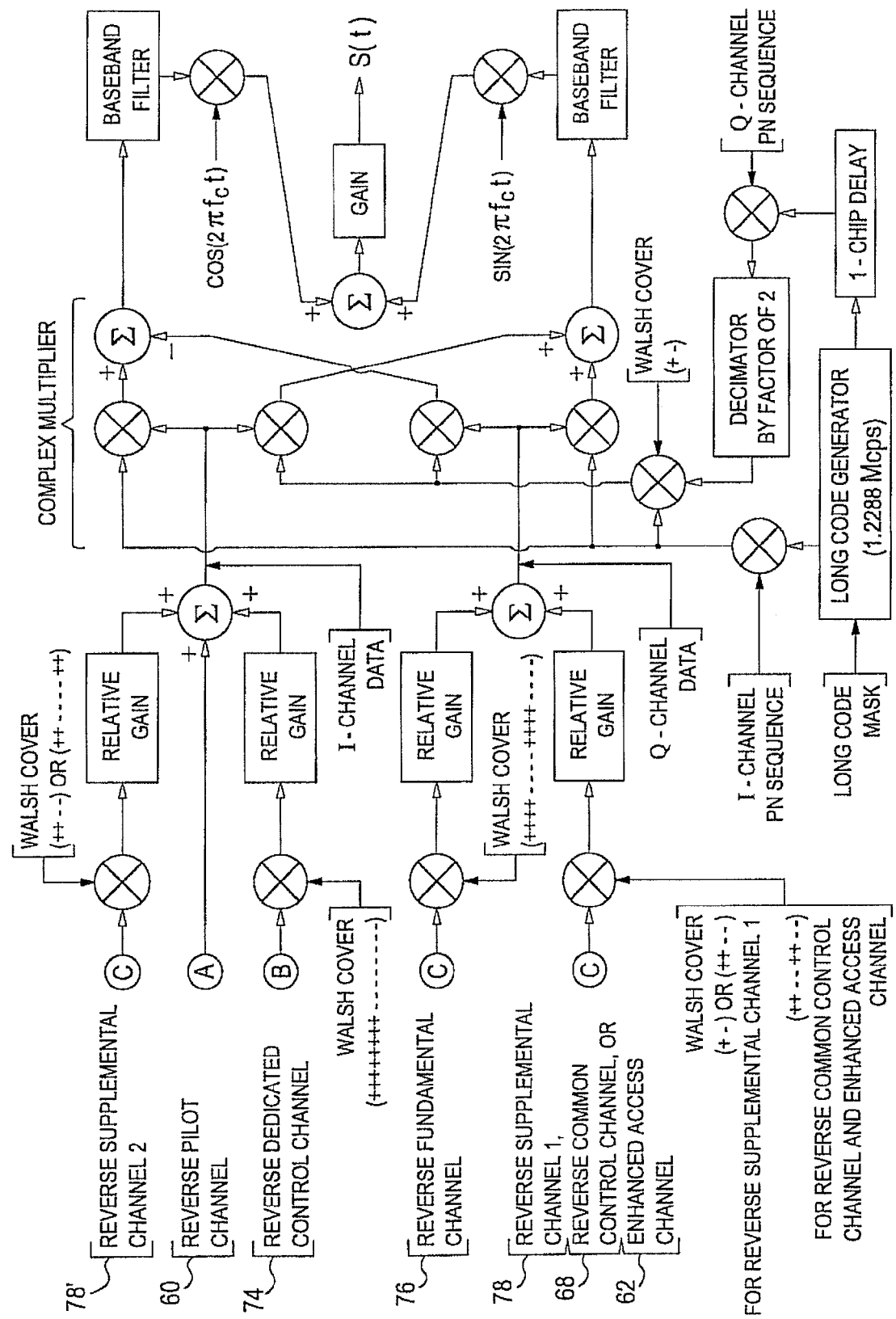
FIG. 4 is a communications mapping diagram for the reverse link CDMA channels of FIG. 3.

While Table 2 shows only a single supplemental, or data, channel, it is to be understood that the invention has application when any number of channels are brought online. The present invention has application to any combination of the reverse link channels shown in FIG. 3 as well as to others not shown or described, as will be understood by those skilled in the art. The relative powers of the LUT can optionally be updated by the mobile processor based upon signaling from the base station for a change in relationship between the base powers. (See Eqn. (1)). Additionally, as one skilled in the art would understand, the relative powers in Table 2 can be in reference to the power of any convenient channel, in lieu of that of the supplemental channel.

When a data channel is requested, the mobile determines from the LUT the maximum data rate that the mobile is capable of sending without exceeding the RF amplifier power output capability. The maximum data rate is determined based upon the real-time operating conditions of the mobile. When the mobile negotiates the addition of a supplemental, or data, channel, the processor determines the relative power required by the currently-negotiated, or default, data rate for the data channel from the LUT, as described in the above example of Table 2. The processor then adds this amount of power to the power required by the other active reverse link channels currently being transmitted to determine the projected output power required of the mobile due to the addition of a data channel at that data rate. This projected power is compared to the maximum power capability of the mobile, that is stored as a digital value in memory. If the projected power is less than the lower level of a pre-selected tolerance (to be described further below) of the maximum output power, then the processor selects a higher data rate. The processor again determines the projected output power due to the addition of a data channel at the higher data rate, to the other active channels in use, and compares this to the maximum output power capability. If the negotiated data rate results in a projected output power that is above the maximum power capability, a lower data rate is selected and the projected power determination and comparison steps are repeated. This process of evaluating higher and lower data rates for projected output power is repeated until the projected output power is within a preselected tolerance range of the mobile maximum power.

Figure 1:
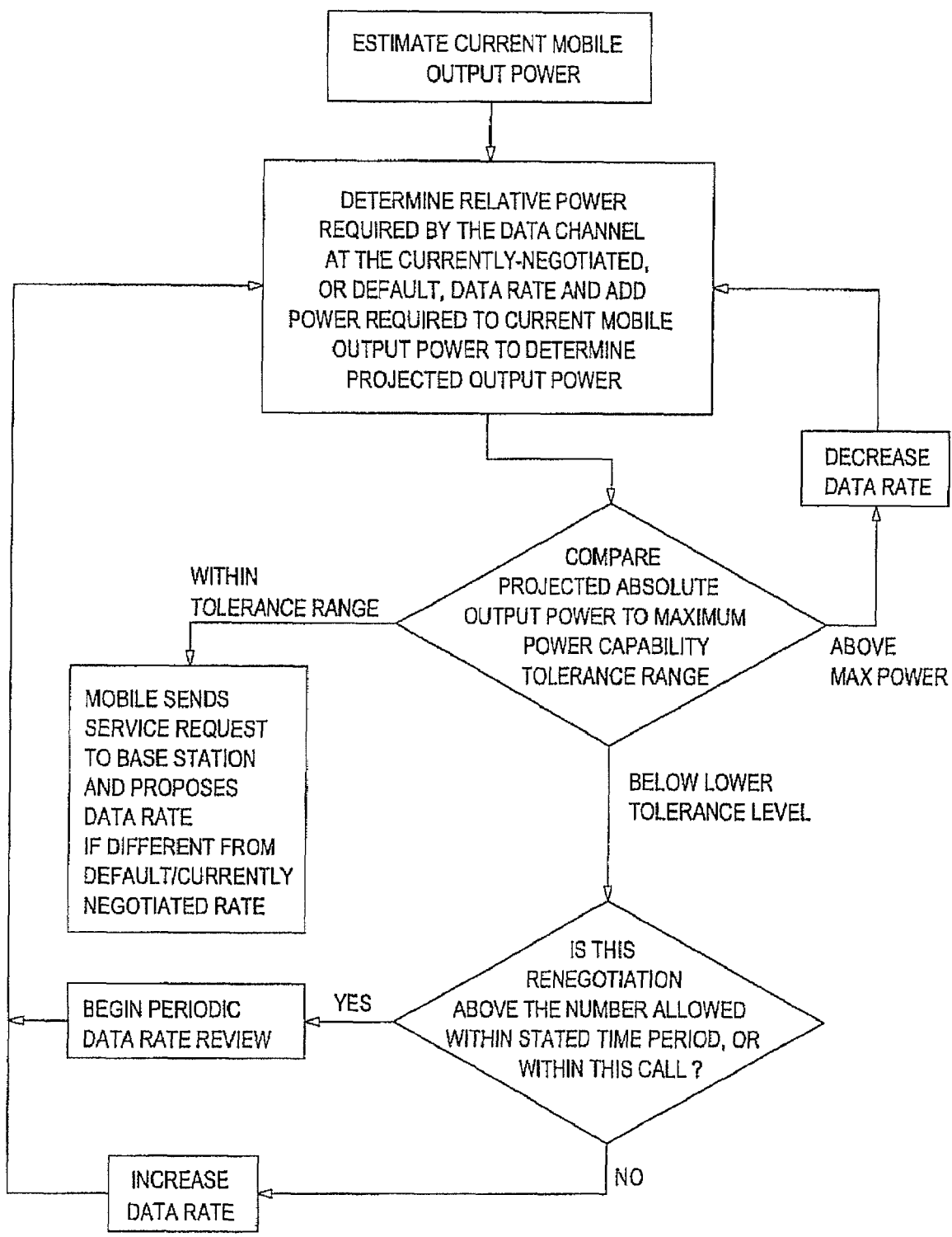
FIG. 1 is a flow chart of the preferred method of the present invention.
Figure 2:
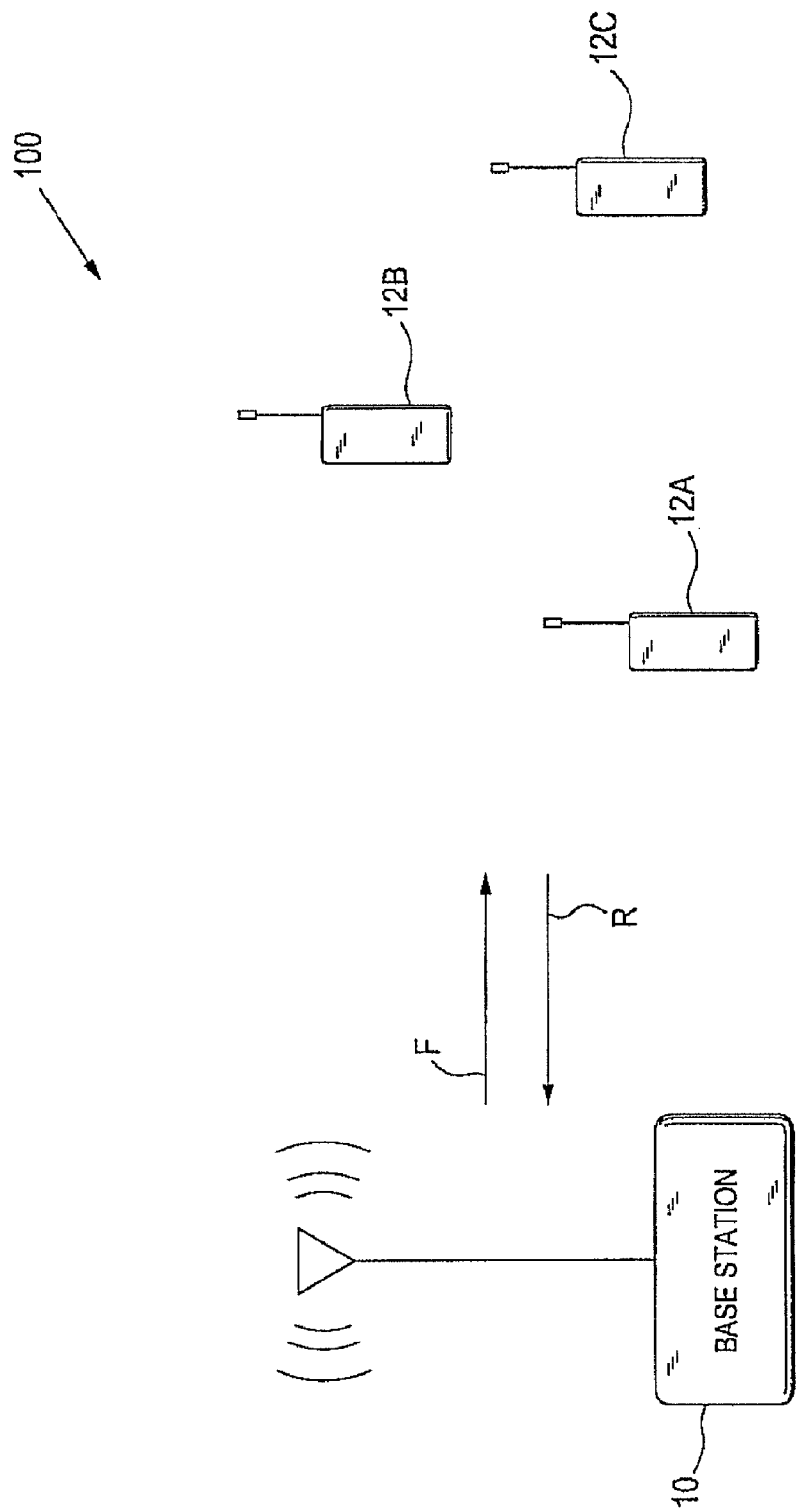
FIG. 2 is a diagram demonstrating the forward and reverse links of a CDMA cellular telecommunications system.

Referring to FIG. 1, a flow chart demonstrates the method by which the mobile determines the maximum data rate for a data channel that is to be added to transmission, as well as to periodically review the currently-negotiated, or default, data rate. The method is preferably implemented in the mobile processor. First, the mobile unit processor, through a suitable algorithm, estimates current RF amplifier output power by averaging a series of measured power output values obtained from processor 22. The transmitter AGC value can be used as this estimate. The AGC value is input to processor 22 through open and closed loop power control over a given period of time. (See FIG. 5.) In the second step, the processor executes a routine to determine the relative power required by the data channel at a first data rate, which is the currently-negotiated or default data rate, with reference to other active high processing gain channels by accessing a LUT in memory, similar to that of Table 2. It is to be understood, however, that a suitable equation can serve the same purpose as a LUT in determining the relative power required for the data rate.

From the relative gain in the LUT, the processor determines the power required by the data channel and adds the required power to current RF amplifier output power to arrive at a projected output power. In the third step, the processor executes a comparison routine that compares the projected absolute (dBm) output power to the maximum absolute (dBm) output power capability of the mobile RF amplifier. The comparison is preferably made between digital values; the projected absolute power is converted from a dBm value to a digital value that is then compared to the maximum output power capability stored as a digital value in memory. If the projected output power falls within a pre-selected tolerance range of the maximum power capability, then transmission occurs at that rate.

If the projected output power is above the maximum power capability, then the mobile selects a lower data rate and repeats the process of determining the power required for the data channel at that data rate, as described above. The data rate is repeatedly lowered, if necessary, until a data rate is located that results in a projected output power within a pre-selected tolerance of the maximum output power capability. It will be appreciated that different algorithms may be chosen by which the data rate is selected resulting in a projected output power within the pre-selected tolerance of the maximum. For example, the data rate step size and therefore the projected output power step size may vary. Additionally, the sequence of changes in data rate and therefore in the projected output power may be either increases or decreases in any order.

Figure 6:
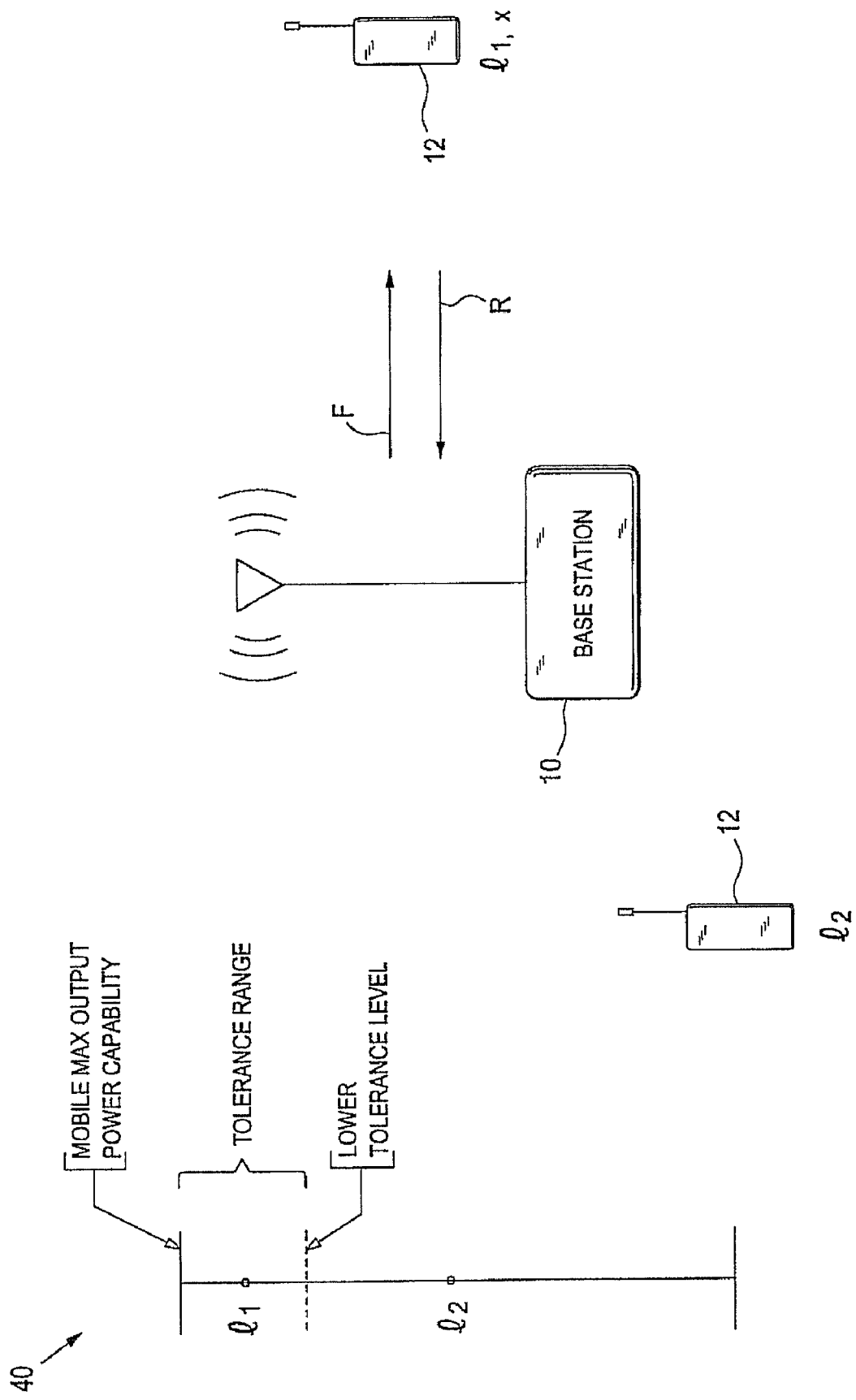
FIG. 6 is a diagram depicting mobile output power at two different locations with respect to the base station within a cell.

If the lowest data rate has been reviewed and the power required is not available, the mobile will not open a data channel. The tolerance can be seen in FIG. 6, a diagram depicting mobile transmitter output power at 40. FIG. 6 shows the maximum output power capability of the mobile transmitter, along with a tolerance range within which the projected output power is acceptable. Projected output power is accepted within the tolerance range to prevent excessive renegotiation of the data rate.

If the negotiated, or default, data rate results in a projected output power that is below the lower tolerance level, as can be seen in FIG. 6, then a higher data rate is selected by the processor. The processor then determines the power required for the data channel at that data rate, determines the projected output power, and compares the projected output power to the maximum output power as described above. Higher data rates are repeatedly evaluated, as necessary, until the projected output power falls within the pre-selected tolerance of the maximum output power capability. Once a data rate is found which results in a projected output power within the pre-selected tolerance range, that rate is proposed to the base station for transmission, if different from the default or currently-negotiated data rate.

Another step may be performed to monitor the number of negotiations that have occurred between the mobile and base station within a stated time period, such as during a call, to prevent the mobile from increasing the data rate too frequently. The processor monitors the number of negotiations that have occurred in the stated time period and compares that number to a value stored in memory. If the number of negotiations is above the stored value, then it is placed in a periodic review mode and the data rate is held at the currently-negotiated, or default, rate rather than being renegotiated. While in the periodic review mode, the processor reviews the relative power required for the currently-negotiated data rate and the projected output power periodically, to determine whether the data rate should be increased or decreased due to changes in available mobile transmitter output power, as described below.

Once a data rate is found that results in a projected output power within the pre-selected tolerance, the mobile sends an origination, page response, service request, or supplemental channel request message to the base station proposing that data rate. Once the base station accepts the proposed data rate, it sends a service connect message to the mobile. The mobile then responds with a service connect completion message to the base station and implements the configuration. Optionally, the negotiated data rate is then stored as the currently negotiated rate in memory and replaces the default data rate so that the next time the data rate power is determined the process begins with the most recent rate for a period of time. Upon power down, the data rate is then restored to the original default data rate value.

The periodic review mode allows the mobile to reassess its power availability and increase or decrease the data rate accordingly. If, for example, the mobile moves closer to the base station it may have increased available power due to the decreased transmission distance. Referring to FIG. 6, mobile 12 is shown within a cell at two different times, and two different corresponding locations, $I_1$ and $I_2$, in relation to base station 10. When mobile 12 is further away from base station 10 at location $I_1$, it is transmitting within the pre-selected tolerance range as shown in the power diagram 40, and operates a data channel at a currently-negotiated data rate of x in the reverse link. When mobile 12 moves closer to base station 10 to location $I_2$, the power control function in the forward link causes mobile 12 to transmit at a lower output power as shown in the power diagram 40. Because the relative power required for the currently-negotiated data rate is periodically reviewed, mobile 12 may be able to select a higher data rate than x, due to the available output power. Conversely, if mobile 12 moves to a location farther from base station 10, the data rate may be decreased to remain within the maximum output power capability of the mobile. This method is also applicable during hand-off, when the mobile moves to a different cell resulting in a change in base station. A change in base station can result in increased or decreased available mobile transmitter output power due to increased or decreased receive power at the new base station, respectively. Optionally, a review is triggered upon hand-off so that the data rate can be increased or decreased if possible to use newly available output power or necessary to avoid a dropped call, respectively.

While in the periodic review mode, the data rate can be renegotiated even if the mobile is presently transmitting data over a low processing gain channel. If the mobile is currently transmitting data, the processor first estimates the current output power, which in this instance includes the power required to transmit data. Then this power is compared to the maximum output power capability of the transmitter. If the current output power is within the pre-selected tolerance range, then the data rate remains unchanged by the processor. If the current output power is outside of the tolerance range, then a higher or lower data rate is evaluated by referencing the LUT. First, because the current output power included power required for data transmission over a low processing gain channel, or channels, the amount of power required to operate only the high processing gain channels is determined by referencing the LUT for the relative power required of each channel in operation, and the power required by the low processing gain channel, or channels, that are currently in operation is ignored. Once the power required to operate only the high processing gain channels is determined, then the relative output power required for the data rate being evaluated can be added to that power to determine the projected output power for that data rate. Higher and lower data rates are evaluated until a data rate is located with a projected output power within the pre-selected tolerance of the maximum output power.

Once an appropriate data rate has been selected, that rate is proposed to the base station. As before, the number of renegotiations is limited to prevent excessive messaging to the base station. In the alternative, rather than determining relative and projected powers for particular data rates, the processor can simply increase or decrease the data rate by one or more levels, based upon the comparison between the current output power and the maximum output power, and propose that data rate to the base station. This may result in increased messaging with the base station, but eliminates the added step of separating the power associated with the high processing gain channels from the power associated with the low processing gain channel, or channels, over which data is currently being transmitted.

In a second embodiment of the invention, output power for the high processing gain channels is falsely limited and renegotiation is accomplished at the base station due to the received frame error rate of the data transmitted to the base station. As in the first embodiment, the mobile is programmed with the relative power requirements for each channel. Power for the low processing gain channel is then reserved by limiting the total output power available to the higher processing gain channels when they are the only channels active, so that there is enough power remaining for the low processing gain channel or channels when brought online. This effectively limits the range of the mobile to its intended data capabilities, for example, to a data rate of 38.4 kbps. For example, if the processor limits the output power allocated to the pilot, dedicated control and fundamental channels to 81.4 mW, 140.7 mW and 140.7 mW respectively when the three are in operation, then 458 mW are automatically reserved for the supplemental channel to come online at 38.4 kbps. (See Table 2.) If the base station attempts to increase the mobile output power through reverse link power control, the frame error rate at the base station will increase. The base station then independently determines whether a renegotiation for a different data rate, or handoff is required if the frame error rate is excessive, without additional messaging.

A novel method for negotiating the data rate for a particular communication channel in a multi-channel system has been described with respect to the reverse channel link of a cellular telecommunications system. Although particularly suited for such use, the present invention is also applicable to multiple channel transmission in other types of systems. Satellite-based wireless communication systems, optical communication systems, wired digital communication systems, and systems transmitting radio frequency signals via co-axial or other broadband cables benefit through incorporation of the invention. The present invention has application in any multi-channel communication system having limited transmission power output.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of assigning a transmission data rate in a communication system comprising a transmitter, a receiver, and a plurality of communication channels, the method comprising the steps of:
   estimating a current transmitter output power due to transmission by averaging output power over a stated time period;
   determining a relative transmitter output power required for transmission over a channel based upon a first data transmission rate for the channel;
   determining a projected output power required for transmission by adding the relative transmitter output power to the estimated current transmitter output power;
   comparing the projected output power to a maximum transmitter output power; and
   selecting a second data transmission rate for the channel based upon the comparison between the projected output power and the maximum transmitter output power.

2. The method of claim 1 wherein the measuring transmitter output power comprises measuring transmitter output power due to transmission over at least one high processing gain channel.

3. The method of claim 1 wherein the measuring transmitter output power comprises measuring transmitter output power due to transmission over at least one high processing gain channel and at least one low processing gain channel.

4. The method of claim 1 wherein the determining the relative transmitter output power comprises:
   storing the relative transmission power required for each channel at particular data transmission rates in a memory;
   accessing the relative transmitter power required for each channel at a particular data rate from the memory; and
   converting the relative transmission power to an absolute transmission power based upon the measured transmitter output power.

5. The method of claim 4 wherein the storing relative transmission power comprises storing a decibel power for each channel with reference to one of the channels.

6. The method of claim 1 wherein the determining the projected output power required comprises adding the relative power required for each low processing gain channel to the measured output power.

7. The method of claim 6 wherein the determining the projected output power required comprises adding the relative power required for each low processing gain channel to the output power required for transmission over active high processing gain channels.

8. The method of claim 1 wherein the comparing the projected output power to a maximum transmitter output power comprises determining whether the projected output power is within a tolerance range of the maximum transmitter output power.

9. The method of claim 1 further comprising periodically repeating the measuring, the two determining, and the comparing steps.

10. The method of claim 1 wherein the selecting a second data transmission rate comprises at least one step selected from the group consisting of:
repeatedly decreasing the data transmission rate until the projected output power is within a maximum transmitter output power tolerance, and
repeatedly increasing the data transmission rate until the projected output power is within a maximum transmitter output power tolerance.

11. The method of claim 1 further comprising proposing the selected second data transmission rate to the receiver.

12. The method of claim 11 further comprising limiting the number of times that an increased data rate is proposed to the receiver within a stated time period.

13. The method of claim 1 further comprising storing the selected second data transmission rate as a default data rate.

14. The method of claim 1 wherein the determining the projected output power comprises converting the determined projected output power into a digital value.

15. An apparatus for assigning a data transmission rate in a communication system comprising a transmitter, a receiver, and a plurality of high and low processing gain communication channels, the apparatus comprising:
means for estimating a current transmitter output power due to transmission by averaging output power over a stated time period;
means for determining a relative transmitter output power required for transmission over a channel based upon a first data transmission rate for the channel;
means for determining a projected output power required for transmission by adding the relative transmitter output power to the estimated current transmitter output power;
means for comparing the projected output power to a maximum transmitter output power; and
means for selecting a second data transmission rate for the channel based upon the comparison between the projected output power and the maximum transmitter output power.

16. A wireless mobile communication device comprising:
a transmitter,
a receiver;
a processor coupled to the transmitter an the receiver, the processor executing a method for assigning a data transmission rate in a communication system, the method comprising:
estimating a current transmitter output power due to transmission by averaging output power over a stated time period;
determining a relative transmitter output power required for transmission over a channel based upon a first data transmission rate for the channel;
determining a projected output power required for transmission by adding the relative transmitter output power to the estimated current transmitter output power;
comparing the projected output power to a maximum transmitter output power; and
selecting a second data transmission rate for the channel based upon the comparison between the projected output power and the maximum transmitter output power.

* * * * *